Sept. 16, 1930.  E. QUATTROCCHI  1,776,041
MACHINE FOR THE REPRODUCTION OF SCULPTURE
Filed Feb. 26, 1927  5 Sheets-Sheet 1
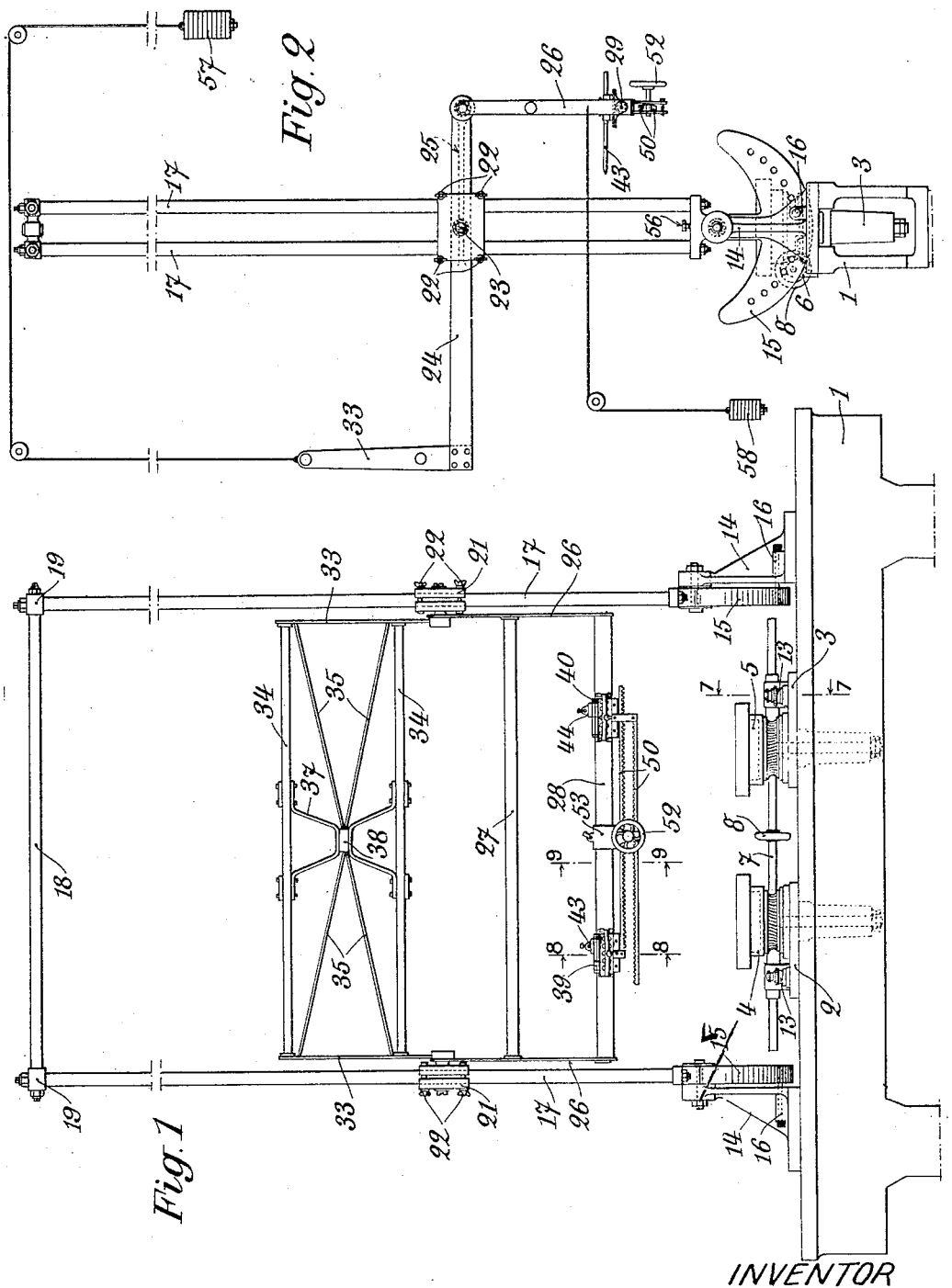
INVENTOR
Edmondo Quattrocchi
by
Langner, Parry, Card & Langner Att'ys.

Sept. 16, 1930.  E. QUATTROCCHI  1,776,041
MACHINE FOR THE REPRODUCTION OF SCULPTURE
Filed Feb. 26, 1927  5 Sheets-Sheet 2
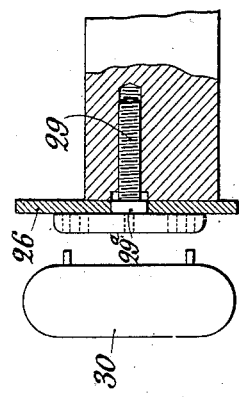
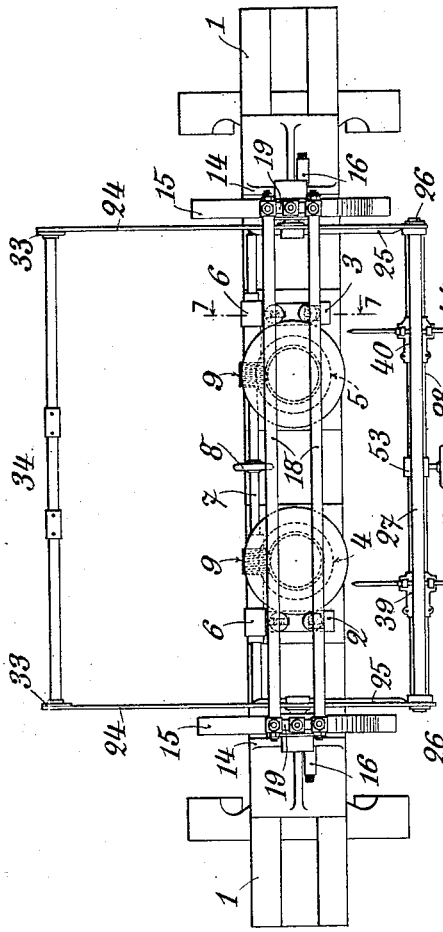
INVENTOR
Edmondo Quattrocchi
by
Langner, Parry, Card & Langner Att'ys.

Sept. 16, 1930.   E. QUATTROCCHI   1,776,041
MACHINE FOR THE REPRODUCTION OF SCULPTURE
Filed Feb. 26, 1927   5 Sheets-Sheet 3
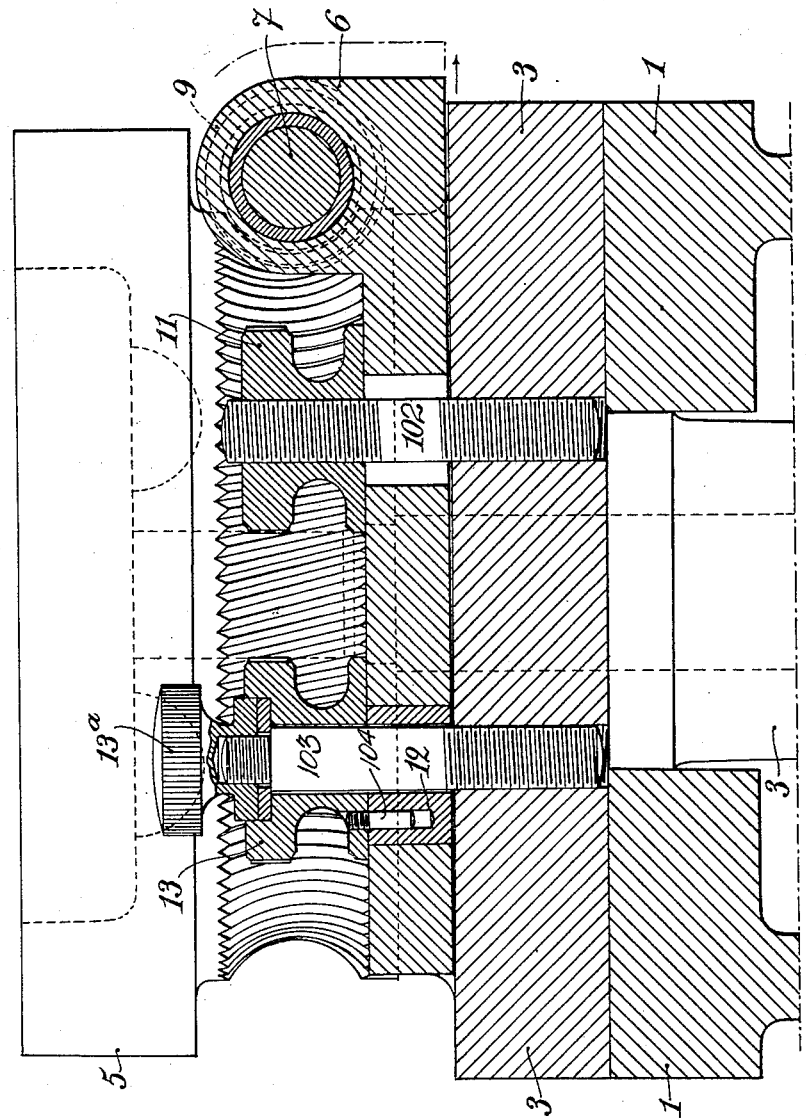
INVENTOR
Edmondo Quattrocchi
by
Langner, Parry, Card & Langner Att'ys Sept. 16, 1930.  E. QUATTROCCHI  1,776,041
MACHINE FOR THE REPRODUCTION OF SCULPTURE
Filed Feb. 26, 1927  5 Sheets-Sheet 4
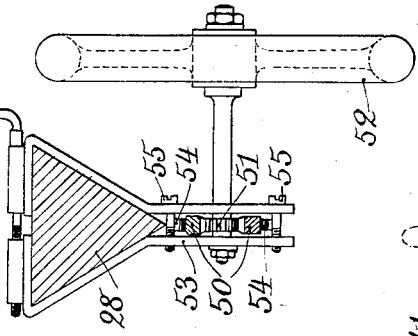
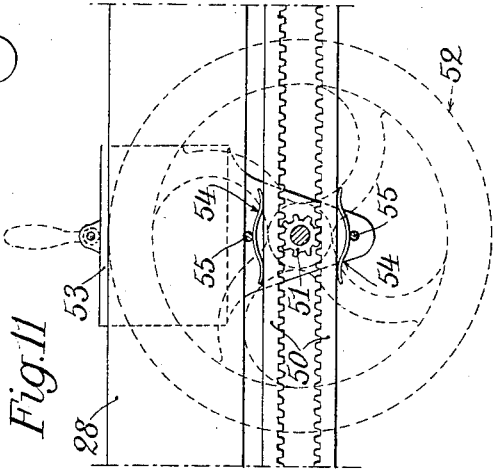
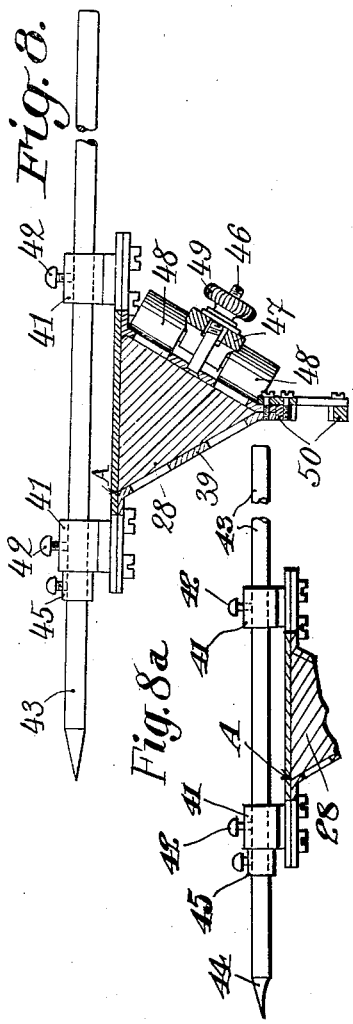
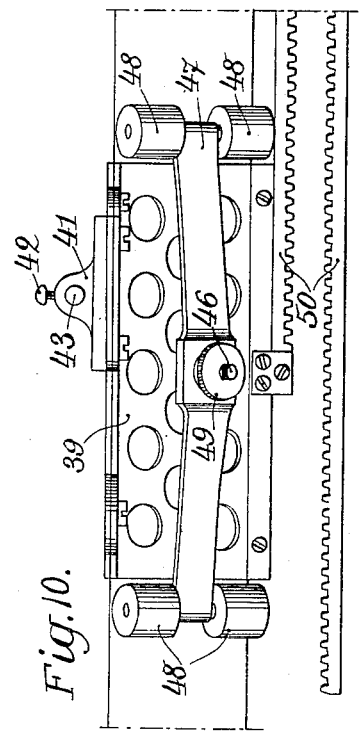
INVENTOR
Edmondo Quattrocchi
by
Langner, Parry, Card & Langner Att'ys Sept. 16, 1930.   E. QUATTROCCHI   1,776,041
MACHINE FOR THE REPRODUCTION OF SCULPTURE
Filed Feb. 26, 1927   5 Sheets-Sheet 5

Edmondo Quattrocchi
Inventor
By
CASnow&Co.
Attorneys.

Patented Sept. 16, 1930

1,776,041

UNITED STATES PATENT OFFICE

EDMONDO QUATTROCCHI, OF PARIS, FRANCE

MACHINE FOR THE REPRODUCTION OF SCULPTURE

Application filed February 26, 1927, Serial No. 171,335, and in France June 17, 1926.

The present invention relates to a machine which provides for the reversed reproduction of the pattern, i. e. a piece of sculpture which is symmetrical with the first.

The said machine comprises a main frame or base upon which are mounted two supports or "stocks" serving respectively to hold the original piece, such as a statue or the like, and the block of material from which the reproduction is to be formed. The said stocks are rotatable through like angles by means of a single controlling mechanism.

Upon the said main frame is mounted a frame or chassis which may be pivoted about and secured in the desired position, and said frame supports the reproducing apparatus, which essentially comprises a pivoting bar carrying a tracer and a cutting tool whereof one follows the surface of the statue and the other reproduces the indications given by the first device, upon the block or piece of work.

Each exploring or contact piece is mounted on a slide which is slidable on the bar, and both slides are moved in conjunction by a single mechanism.

The appended drawings show by way of example various embodiments of the invention.

Fig. 1 is a front elevation of the apparatus, and,

Figs. 2 and 3 are respectively an end elevation and a plan view.

Figs. 4 and 5 show on a larger scale a front elevation with parts in section, and an elevational view of a detail.

Fig. 6 shows on a larger scale a partial vertical section of a tube for the frame.

Fig. 7 is a cross-section of a stock, on the line 7—7 of Fig. 3.

Figure 8A:
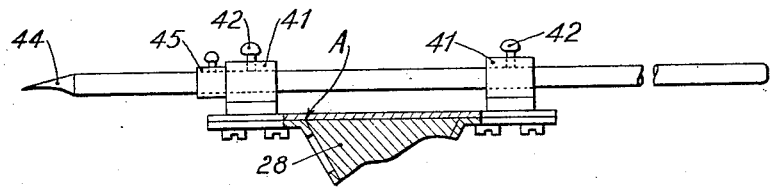

Figs. 8 and 9 show sections of the bar carrying the slides, on the lines 8—8 and 9—9 of Fig. 1 respectively. Fig. 8ª is a view analogous to Fig. 8, showing the cutting tool.

Fig. 10 is a front view of a slide.

Fig. 11 is a vertical section of the mechanism controlling the slides.

The machine herein represented, which is adapted for the reproduction of the reversed reproduction of the pattern, comprises a main frame 1 upon which are adjustably mounted the two supports 2 and 3 in which are rotatable the respective members 4 and 5, designated as "stocks", whereof the first supports the original statue or the like, and the second the block or mass of material serving for the reproduction.

Upon each of the supports 2—3 is mounted a bearing 6 carrying the shaft 7 which may be turned by hand by means of the hand wheel 8; to the shaft 7 are keyed two worms 9 having respectively right and left handed threads and coacting with a corresponding toothed portion formed upon each of the stocks 4 and 5, so that upon turning the said hand wheel the two stocks will rotate through the same angle but in opposite directions.

The base portions of the bearings 6 comprise slots for the insertion of pins 102 and 103 which are secured to the supports 2—3 (Fig. 7) ; one of the said pins carries a nut 11, and the other pin carries an eccentric 12 which is actuated (by means of a stud 104) by the milled knob 13; a nut 13ª cooperates with the knob 13 for holding the said bearing upon the support.

In this manner, if the stocks are to be rotated independently of one another, the eccentrics 12 are rotated—after loosening the nuts 11 and 13ª—so as to release the worm 9 from the toothed parts of the stocks.

Upon the frame 1 and near its ends is mounted a support 14 carrying an axle upon which is rotatable—through ball bearings—a counterweight 15 which may be held in a given position by the fastening bolt or catch 16 which is inserted into one of a set of holes in the said counterweight. Upon the two counterweights is mounted a frame whose uprights consist of two tubes 17, which are connected together at the top by the tubes 18, said tubes being assembled by the connecting members 19. To increase the rigidity of the said frame, the tubes 17—18 are provided at the ends with the pinned members 19ª (Fig. 6) which extend from the tube and are threaded to receive the securing nuts; the tubes are traversed by the steel rods 20 which are threaded at the ends to receive the nuts which maintain them in the tubes.

Upon the uprights of said frame are mounted the boxes 21 which are slidable on the tubes 17 and may be held at any desired height above the main frame 1 of the apparatus by the nuts 22. Each box 21 carries an axle 23 which is mounted in ball bearings and to which is secured a flat bar 24 carrying a rib 25 for strengthening purposes. At one end of the bars 24 is pivotally mounted, by means of ball bearing, the bar 26. The two bars 26 are spaced apart by a tube 27, and are connected together at the outer ends by a bar 28 of triangular section; without being rigidly secured, the said bar must turn only with difficulty, and it is held by screws 29 (Figs. 4 and 5) operated by the wrenches 30, each screw carrying a shoulder $29^a$ engaged in a corresponding hole in the bar 26; the screws 29 are secured in the proper position by the set screws 31 with interposition of a bronze block 32 to prevent damage to the threads of the screws 29.

To the other end of the bars 24 is secured, perpendicular to said bars, a frame which gives to the device 24—26—27—28 the desired rigidity, and consists of two bars 33 cross-connected by the tubes 34 and braced by the stays 35 and the members 37 which latter are secured by a central member 38 held by the said stays. Upon the said bar are slidably mounted the two carriages or slides 39 and 40, of like construction, these consisting for instance of three brass plates (Figs. 8 and 10) suitably connected together, the two side plates being pierced with holes so as to reduce the weight of the slides.

To the supports 41 which are mounted on the upper plates, are secured by the screws 42, suitable members 43 and 44, designated as the tracer and the cutting tool respectively, which are mounted on the respective slides 39 and 40; the position of the said tools on their slides is determined by the stop rings 45 which may be held by screws.

The tracer 43 comprises a pointed portion (Fig. 8) by means of which the statute (or the like) on the stock 4 may be explored; the cutting tool 44 has a suitable shape shown on Fig. $8^a$ and serves to cut into a plaster block mounted on the stock 5 and to thus form the counter part of the original statue.

To the outer lateral plate of each slide is secured an axle 46 upon which is engaged a spring 47 which may have the form shown in the drawings and is provided at its ends with axles upon which are mounted the rollers 48 adapted to roll upon the bar 28; a milled knob 49 screwed to the axle 46 serves to press the rollers 48 strongly against the said bar; the edge of the bar as shown at A in Fig. 8 is perfectly rectilinear from the fact that the upper and the internal lateral face of the bar 28 are accurately trimmed; the internal lateral plate of the said carriage or slide is strongly applied against the corresponding face of the bar.

Upon each slide is mounted a rack 50 coacting with a pinion 51 whose rotation is controlled by a hand wheel 52 (Figs. 9 and 10); the pinion 51 is mounted in a support 53 which is secured exactly at the middle of the distance between the two stocks; in the interior of the support are movable the racks 50 which are brought into contact with their pinions by means of the springs 54 bearing upon the screws 55 connecting together the two branches of the support 53.

By turning the hand wheel 52 in either direction, the two slides 39—40 may be separated or brought together by equal amounts with reference to the middle of the bar 28, so as to reproduce upon the plaster block disposed on the stock 5 such forms of sculpture as will be exactly the same as those of the original. To obtain the required accuracy of the work, the line connecting the pivot axles of the counterweight 15 must be parallel to the line connecting the axles 23 mounted on the boxes 21 and must be situated in the same plane, and further, these two lines must always be exactly parallel to the edge A of the bar 28. To prevent all distortion of the frame 17—18 mounted on the said counterweights, when the apparatus is erected, these latter carry for instance a bolt 56 serving to secure the gauge or indicator $56^a$ which shows the exact distance at which the said counterweights are to be placed.

To this purpose, the gauge $56^a$ shown in dot and dash lines in Fig. 6, is formed by a flat bar provided at its two ends with pins $56^b$ which are engaged in corresponding holes provided in each of the members 15 the distance between the two sets of pins $56^b$ being exactly the same as that the said counterweights are to be disposed.

The rigidity given to the whole device which is movable on the axis of the counterweights permits to obtain the essential condition consisting in the fact that all points of the edge A are at exactly the same height above the main frame 1 at all times.

To obviate all fatigue to the operator, the movable device which is pivoted on the axle 23 of the boxes 21 is connected with an adjustable weight 57 (Fig. 2) which maintains the device in indifferent equilibrium at all times and irrespectively of its position; the bar 28 is connected with an adjustable weight 58 in such manner that the tracer 43 and cutting tool 44 will always be applied against the original statue and the piece of work. In Fig. 2, this weight 58 is placed at the front part of the bar or next the operator, but it might be placed at the rear of the operator should the conditions of the work require it.

By means of the screws and nuts 22 securing the boxes 21, these may be held upon the uprights 17 at the proper height according to the work, but it is obvious that after each displacement of the boxes 21 the operator must take care that the axles 23 have exactly the same height above the main frame.

Having thus described my apparatus, what I claim as new therein, and my own invention, is:—

1. In a machine for the reproduction of sculpture, comprising two stocks for supporting a pattern and a block for the reproduction of said pattern respectively, the combination of a main frame, two supports on the said frame, the said stocks being rotatable in the said supports, means for rotating the said stocks through equal angles, but in contrary directions, a rigid frame structure mounted on the machine frame, means for giving said structure the desired inclination and means for maintaining the latter, a second rigid frame structure pivoted to the first, arms pivoted to the said second structure, a bar mounted between said arms, two holders adapted to slide on said bar and receiving the first a tracer and the second a cutting tool for engaging the said block, and means for simultaneously displacing the said holders and the tools secured thereto in contrary directions.

2. In a machine for the reproduction of sculpture, comprising two stocks for supporting a pattern and a block for the reproduction of said pattern respectively, the combination of a main frame, two supports on the said frame, the said stocks being rotatably mounted in the said supports, a longitudinal shaft on the said frame, two worms keyed to said shaft and having respectively right and left handed threads, a threaded portion provided on each of the said stocks and adapted to engage the said worms so as to be rotated through equal angles but in contrary directions when the said shaft is actuated, a rigid frame structure mounted on the machine frame, means for giving said structure the desired inclination and means for maintaining the latter, a second rigid frame structure pivoted to the first, arms pivoted to the said second structure, a bar mounted between said arms, two holders adapted to slide on said bar and receiving the first a tracer and the second a cutting tool for engaging the said block, and means for simultaneously displacing the said holders and the tools secured thereto in contrary directions.

3. In a machine for the reproduction of sculpture, comprising two stocks for supporting a pattern and a block for the reproduction of said pattern respectively, the combination of a main frame, two supports on the said frame, the said stocks being rotatable in the said supports, means for rotating the said stocks through equal angles, but in contrary directions, a rigid frame structure mounted on the machine frame and whereof the uprights are situated in planes strictly perpendicular to the longitudinal axis of the machine frame and may be pivoted in said planes and maintained in any desired position, a second rigid frame structure pivoted inside the first frame structure by means of ball-bearing mounted axles which may be fixed at any desired height on the said uprights, arms secured by means of ball-bearings to the said second frame structure in a parallel disposition, a bar mounted between said arms, two holders adapted to slide on said bar and receiving the first a tracer and the second a cutting tool for engaging the said block, and means for simultaneously displacing the said holders and the tools secured thereto in contrary directions.

4. In a machine for the reproduction of sculpture, comprising two stocks for supporting a pattern and a block for the reproduction of said pattern respectively, the combination of a main frame, two supports on the said frame in which the two stocks may rotate through equal angles but in contrary directions, a rigid frame structure pivoted to the first, a bar pivotally mounted on the said second frame and adapted to be displaced parallelly to the longitudinal axis of the machine, the said bar carrying two slidable holders receiving respectively a tracer for following the contour of the pattern and a cutting tool for engaging the said block, so that said tools, for a given position of their holders upon the said bar may be displaced only in planes which are perpendicular to the longitudinal axis of the machine frame, a rack carried by each of the said tool holders, a pinion engaging the said racks so that a rotation of the said pinion in a given direction will correspond to an equal displacement of the tool holders but in contrary directions.

In testimony whereof I have hereunto affixed my signature.

EDMONDO QUATTROCCHI.